Feb. 5, 1946.     R. J. WOODS     2,394,506
FUEL TRANSFER SYSTEM
Filed Oct. 22, 1943     2 Sheets-Sheet 1
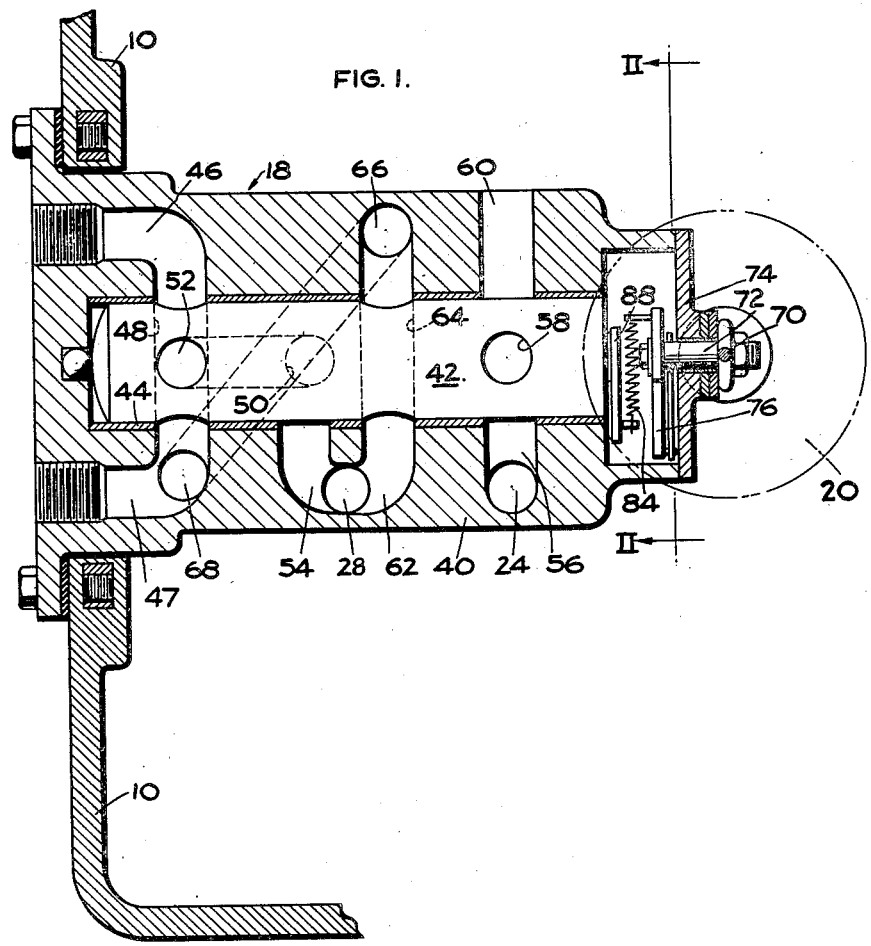
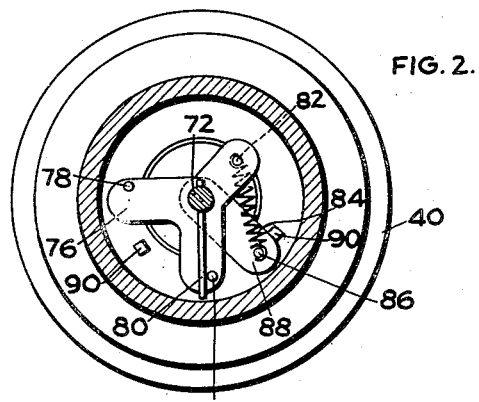
INVENTOR
ROBERT J. WOODS
BY
Bean, Brooks, Buckley & Bean
ATTORNEYS Feb. 5, 1946.    R. J. WOODS    2,394,506
FUEL TRANSFER SYSTEM
Filed Oct. 22, 1943    2 Sheets-Sheet 2

INVENTOR
ROBERT J. WOODS
BY
Beau, Brooks, Buckley & Beau.
ATTORNEYS

Patented Feb. 5, 1946

2,394,506

UNITED STATES PATENT OFFICE 2,394,506

FUEL TRANSFER SYSTEM

Robert J. Woods, Grand Island, N. Y., assignor to Bell Aircraft Corporation, Buffalo, N. Y.

Application October 22, 1943, Serial No. 507,309

6 Claims. (Cl. 158—36.5)

This invention relates to fuel transfer systems and control means, such as are adapted, for example, to provide and control flow of liquid fuel from an auxiliary tank to a main tank in aircraft or the like. More specifically, the invention relates to improvements in fuel flow control valve arrangements for the purpose above referred to; and a primary object of the invention is to provide an improved auxiliary to main tank fuel flow system for aircraft and improved control means therefor which is in the form of a structurally simple and compact and positive acting unit. Other objects and advantages of the invention will appear from the specification hereinafter.

In the drawings:

Fig. 1 is a vertical section through a control valve device of the invention;

Fig. 2 is a section taken along line II—II of Fig. 1;

Figure 3:
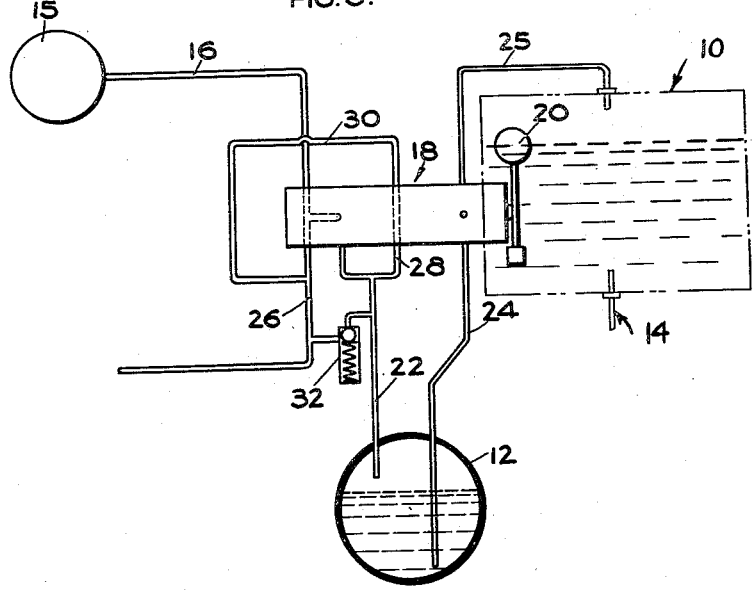
Fig. 3 is a diagrammatic illustration of a fuel supply system of the invention, with the control means thereof disposed in non-transfer condition.
Figure 4:
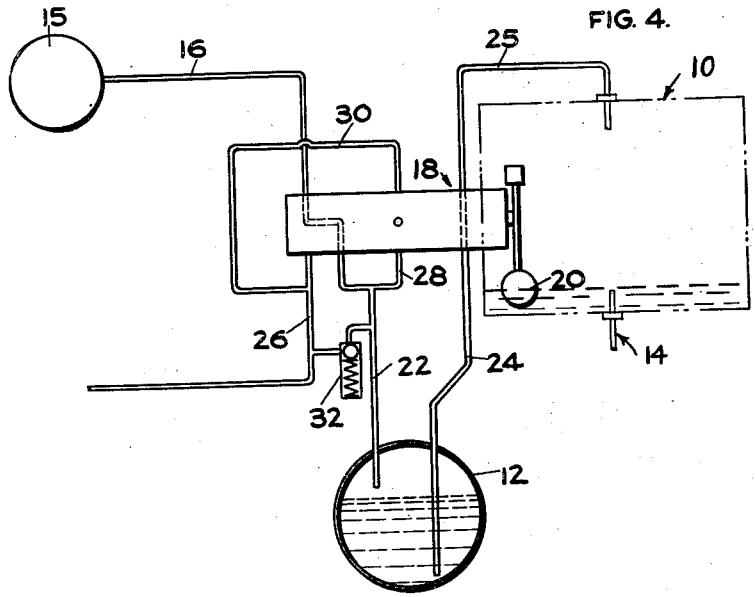
Fig. 4 is a view corresponding to Fig. 3 showing the control means set in fuel transferring condition.

The drawings illustrate the invention in conjunction with a main fuel tank of which a wall portion is indicated at 10 (Fig. 1) and an auxiliary fuel tank 12 (Figs. 3–4). As illustrated diagrammatically in Figs. 3–4, the fuel transfer system is arranged to employ pressure forces diverted from a pump device such as is customarily employed in conjunction with an aircraft engine supply system primarily for the purpose of forcing fuel to feed from the main fuel tank to the engine, as through a conduit 14 (Figs. 3–4). Thus, in the drawings, the pressure pump of the system is indicated diagrammatically at 15; and a conduit 16 leads from an outlet port of the pump into the control valve of the invention which is indicated generally at 18.

As indicated diagrammatically in Fig. 4, the control valve 18 is adapted to be adjusted to a fuel transfer position in response to lowering of a float device 20 which is in floating contact with the fluid within the main tank. The valve device 18 is so arranged that when the float 20 lowers to the position shown in Fig. 4 the valve control member is automatically adjusted so as to provide for free access by pressure forces from the pump 15 into the conduit 16 and through the valve device 18 and then into a conduit 22 which leads into the interior of the auxiliary tank 12. Consequently, under this condition of valve adjustment, the pressure forces of the pump 15 are directed into the auxiliary tank 12 in such manner as to be adapted to force the fuel supply thereof to flow through an outlet conduit 24 and thence into the main tank.

As illustrated in Fig. 3, however, upon raising of the float 20, as in response to corresponding raising of the level of fuel in the main tank to any predetermined level, the control member of the valve device 18 will be thereupon actuated in such manner as to block the passage of pressure forces from the pump and through the valve and into the auxiliary inlet tube 22; whereby feeding of fuel from the auxiliary tank to the main tank will cease until such time as the level of fuel in the main tank drops again to such a position as to actuate the float controlled valve again to the position illustrated in Fig. 4. When the valve device is in closed or non-transferring position, the pressure forces from the pump 15 are directed through the valve device so as to pass directly into a venting conduit 26; and a branch 28 of the auxiliary inlet conduit 22 is thereby brought into open communication with a passageway through the valve device whereby excess pressure forces within the auxiliary tank may simultaneously vent through an escape conduit 30 which also leads into the vent tube 26. A relief valve 32 is disposed in a line bridging the auxiliary conduit 22 and the vent conduit 26, and the relief valve is so arranged as to be adapted to permit escape of excess vapor pressure forces from the auxiliary tank under any condition of the valve setting.

More specifically, and by way of example only, the fuel control valve device 18 may be constructed as illustrated in Figs. 1–2 to comprise a cylindrical housing 40 which is centrally bored to receive a valve stem 42 in rotatable relation therein. If preferred, the housing 40 may be lined with a metallic sleeve 44 to take the wear of the valve stem rotation and to insure permanency of the fluid-tight fit therebetween. The casing 40 is formed with generally diametrically opposed pressure inlet and outlet ports 46—47, respectively, which ports are arranged to receive in open communication therewith the conduits 16—26, respectively. The ports 46—47 of the casing extend inwardly thereof and thence are directed into registry with the valve stem 42 at opposite sides thereof; and the valve stem is bored as indicated at 48 transversely therethrough so as to be adapted to provide an open passageway leading from the inlet port 46 to the outlet port 47 when the valve stem is rotated to the non-transfer position thereof illustrated in Figs. 1 and 3. Thus, when the valve stem is in the non-transfer position the pressure forces in the conduit 16 from the pump 15 are simply vented into the conduit 26 as explained hereinabove.

The valve stem 42 is also provided with a drilled channel 50 extending generally transversely but diagonally therethrough and in a plane at approximately right angles to the plane of the channel 48. The channel 50 is so arranged that when the valve stem is rotated approximately 90° from the position thereof shown in Fig. 1, the end portion 52 of the channel 50 is thereby moved into open communication with the inlet port 46 and the opposite end of the channel 50 is thereby moved downwardly into open communication with a port 54 in the casing wall structure which leads into communication with the auxiliary tank inlet conduit 22. Thus, in this position of adjustment of the valve stem 42, such as automatically results from lowering of the float 20 in response to lowering of fuel in the main tank 10 to any predetermined level, the previously open connection between the conduits 16—26 through the valve port 48 is blocked, and the pump pressure forces are thereby transmitted through the valve and the conduit 22 into the auxiliary tank 12.

The fuel outlet conduit 24 leading from the auxiliary tank 12 is coupled into a port 56 extending through one wall portion of the valve casing and into registry with the valve stem 42; and the valve stem is bored as indicated at 58 transversely therethrough in such direction as to provide an open passageway from the port 56 into an oppositely disposed port 60 of the valve casing which leads into the conduit 25 entering the main fuel tank. The valve stem port 58 is so arranged as to register with the fuel inlet-outlet ports 56—60 when the float 20 is in its lowermost position and when the pressure forces from the pump 15 are being directed into the auxiliary tank 12; and thus under such conditions of valve stem adjustment the pressure from the pump 15 will force the liquid fuel to travel from the auxiliary tank into the main tank.

It will be understood, however, that upon raising of the float 20 to the preselected uppermost position thereof in the main tank 10, the valve stem will be arranged to be thereby rotated so as to dispose the conduit 58 in the position shown in Fig. 1 thereby blocking flow of fuel from the auxiliary tank to the main tank at the same time that transmission of pump pressure forces into the auxiliary tank is blocked by the valve stem. The pressure port 54 in the valve casing 40 is provided with a branch 62 which is directed against a portion of the valve stem remote from the position of the other valve casing ports, and the valve stem is transversely bored as indicated at 64 to register with the port branch 62 when the valve is in non-transfer position. The opposite end of the port 64 is directed into registry with a channel 66 in an opposite wall portion of the casing 40 which passes interiorly of the valve casing structure and therearound and thence into open communication at 68 with the pressure venting port 47 thereof. Hence, the channel 66 through the casing wall (Fig. 1) corresponds in function to the escape conduit 30 of Figs. 3–4; and in the case of Fig. 1 the venting conduit 26 will be coupled directly to the port 47 thereof. Thus, when the valve device is in non-transfer position, as illustrated in Fig. 1, any excess vapor pressure forces within the auxiliary tank 12 will be automatically relieved through the devices 28—66; and in Fig. 3 through the devices 22—28—30—26.

In order to provide the control valve device to operate most effectively in the manner described hereinabove, it is preferred to provide the valve stem 42 to move with a "snap" action between fuel transfer and non-transfer positions. For this purpose the float carrying bar 70 may be keyed to a countershaft 72 which is rotatably mounted upon a bearing portion 74 of the casing to extend substantially coaxially with the valve member 42. A crank arm 76 is rotatably mounted upon the shaft 72 and is provided on one of its faces with a pair of angularly spaced abutments 78—78 which are adapted to engage against a crank pin 80 which is keyed to the shaft 72. The crank 76 also carries a pin 82 at its opposite face and a tension spring 84 is disposed between the crank 76 and the arm 88 and is connected at one of its ends to the pin 82 and at the other of its ends to a pin 86 carried by an arm 88 which is keyed to the valve member 42.

In Fig. 2 the valve snap action mechanism is shown in condition corresponding to repose of the valve stem 42 in non-transfer position and subsequent to lowering of the control float to a position about mid-way between its uppermost and lowermost positions; and it will be understood that when the float shaft 72 is further rotated in counter-clockwise direction in response to further lowering of the fuel level in the main tank, the arm 80 will press against the right hand pin 78. Thus, the crank 76 will be moved thereby in counter-clockwise direction until such time as the spring anchoring pin 82 moves around and reaches a position at the opposite side of the center line extending between the pin 86 and the shaft 72, whereupon the spring 84 will act upon the arm 88 to snap the latter in clockwise direction and to thereby rotate the valve member 42 with a snap action into fuel-transfer position. Similarly, reverse movement of the float 20 will ultimately adjust the spring 84 in such manner as to snap the valve member 42 back into non-transfer position after the arm 80 takes up its lost motion between the pins 78—78. Stop abutments 90—90 carried by the valve case limit the range of swing of the arm 88 in both directions to bring the valve stem in operative registry with the casing ports under all conditions of operation.

Although only one form of the invention has been shown and described in detail it will be apparent to those skilled in the art that the invention is not so limited but that various changes may be made therein without departing from the spirit of the invention or the scope of the appended claims.

I claim:

1. An aircraft fuel supply system comprising a main fuel tank, an auxiliary fuel tank, a valve device positioned between said auxiliary fuel tank and said main fuel tank and comprising a casing and a valve stem movable therein, a conduit leading from said auxiliary fuel tank through said valve casing into registry with said valve stem, a conduit leading from said main fuel tank through said valve casing into registry with said valve stem, said valve stem being transversely bored to interconnect said auxiliary tank and main tank conduits in fuel-transfer condition of valve stem adjustment relative to said casing, a pressure pump, a pressure output conduit leading from the pressure output port of said pump through said valve casing into registry with said valve stem, a pressure feed conduit leading from said auxiliary fuel tank through said valve casing into registry with said valve stem, said valve stem being transversely bored to interconnect said pressure output conduit and said pressure feed conduit under fuel-transfer conditions of adjustment of said valve stem, said valve stem being movable relative to said casing away from said fuel transfer adjusted position thereof to discontinue fluid flow through said bored portions of said valve stem and having other bored portions thereof arranged to move into registry with said pressure feed conduit and said pressure output conduit to vent said pressure feed conduit and said pressure output conduit to the atmosphere upon adjustment of said valve stem to non-transfer position, and float means arranged within said main fuel tank to be adjusted in response to alternate raising and lowering of the fuel level therein and connected to said valve stem whereby to move the latter between fuel transfer and non-transfer positions in accord with changes of fuel level within said main tank.

2. An aircraft fuel supply system comprising a main fuel tank, an auxiliary fuel tank, a valve device positioned between said auxiliary fuel tank and said main fuel tank and comprising a casing and a valve stem movable therein, a conduit leading from said auxiliary fuel tank through said valve casing into registry with said valve stem, a conduit leading from said main fuel tank through said valve casing into registry with said valve stem, said valve stem being transversely bored to interconnect said auxiliary tank and main tank conduits in fuel-transfer condition of valve stem adjustment relative to said casing, a pressure supply means, a pressure supply conduit leading from said pressure supply means through said valve casing into registry with said valve stem, a pressure feed conduit leading from said auxiliary fuel tank through said valve casing into registry with said valve stem, said valve stem being transversely bored to interconnect said pressure supply conduit and said auxiliary pressure feed conduit under fuel-transfer conditions of adjustment of said valve stem, said valve stem being movable relative to said casing away from said fuel transfer adjusted position thereof into non-transfer position to discontinue fluid flow through said bored portions of said valve stem and having other bored portions thereof arranged to move into registry with said auxiliary tank pressure feed conduit and said pressure supply conduit to vent said conduits to the atmosphere upon adjustment of said valve stem to non-transfer position, and float means arranged within said main fuel tank to be adjusted in response to alternate raising and lowering of the fuel level therein and connected to said valve stem whereby to move the latter between fuel transfer and non-transfer positions in accord with changes of the fuel level within said main tank.

3. An engine fuel supply system comprising a main fuel tank having an outlet conduit for feeding fuel to the engine, a pressure supply device, an auxiliary fuel tank having a discharge conduit leading into said main tank for transferring fuel thereinto, and a fuel transfer control device comprising a single valve member adjustable to alternately block and unblock the transfer conduit leading from said auxiliary tank to said main tank, a first pressure transmission conduit leading from said supply device to said control member, a second pressure transmission conduit leading from said control member to said auxiliary tank, said valve member having means thereon arranged to divert the pressure forces from said supply device into said auxiliary tank for forcing fuel to flow to said main tank whenever said control device is in fuel transfer condition and to block said pressure supply forces from access to said auxiliary tank whenever said control valve is in non-transfer condition and means operable under such condition to vent said pressure supply forces exteriorly of the system and means operable under all conditions of control device adjustment to vent excess pressure interiorly of said auxiliary fuel tank externally of said auxiliary fuel tank.

4. An engine fuel supply system comprising a main fuel tank having an outlet conduit for feeding fuel to the engine, a pressure supply device, an auxiliary fuel tank having a discharge conduit leading into said main tank for transferring fuel thereinto, and a fuel transfer control device comprising a single valve member adjustable to alternately block and unblock the transfer conduit leading from said auxiliary tank to said main tank, a first pressure transmission conduit leading from said supply device to said control member, a second pressure transmission conduit leading from said control member to said auxiliary tank, said valve member having means thereon arranged to divert the pressure forces from said supply device into said auxiliary tank for forcing fuel to flow to said main tank whenever said control device is in fuel transfer condition and to block said pressure supply forces from access to said auxiliary tank whenever said control valve is in non-transfer condition and means operable under such condition to vent said pressure supply forces exteriorly of the system and means operable under such condition to vent said auxiliary tank exteriorly of the system, and a pressure release valve connected to said auxiliary fuel tank to protect the latter against excess pressure forces under non-transfer conditions and to protect the entire fuel supply system against excess pressure forces under fuel transferring conditions.

5. An engine fuel supply system comprising a main fuel tank having an outlet conduit for feeding fuel to the engine, an auxiliary fuel tank having a discharge conduit leading into said main tank for transferring fuel thereinto, a pressure supply device connected to force fuel to flow from said auxiliary tank to said main tank, and a fuel transfer control device comprising a single valve member adjustable to alternately block and unblock the discharge conduit leading from said auxiliary tank to said main tank, said valve member having means thereon arranged in connection with said pressure supply device and said auxiliary fuel tank and so arranged as to divert the pressure supply from said supply device into said auxiliary tank whenever said control device is in fuel transfer condition and to block said pressure supply from access to said auxiliary tank whenever said control device is in non-transfer condition and means operable to vent the pressure supply externally of said auxiliary fuel tank, and means responsive to changes of level of fuel within said main tank to operate automatically to adjust said valve member between fuel transfer and non-transfer positions.

6. A fuel supply system comprising a source of fluid pressure, a main fuel tank, an auxiliary fuel tank, a valve device positioned between said auxiliary fuel tank and said main fuel tank and comprising a casing and a valve stem movable therein, a conduit leading from said auxiliary fuel tank through said valve casing into registry with said valve stem, a conduit leading from said main fuel tank through said valve casing into registry with said valve stem, said valve stem being bored to interconnect said auxiliary tank and main tank conduits in fuel-transfer condition of valve stem adjustment relative to said casing, a conduit leading from said fluid pressure source through said valve casing into registry with said valve stem, a pressure feed conduit leading from said auxiliary fuel tank through said valve casing into registry with said valve stem, said valve stem being bored to interconnect said pressure source conduit and said auxiliary pressure feed conduit under fuel-transfer conditions of adjustment of said valve stem, said valve stem being movable relative to said casing away from said fuel transfer adjusted position thereof to discontinue fluid flow through said bored portions of said valve stem and having other bored portions thereof arranged to move into registry with said auxiliary tank pressure feed conduit and said pressure source conduit to vent said conduits to the atmosphere upon adjustment of said valve stem to non-transfer position, and float means arranged within said main fuel tank to be adjusted in response to alternate raising and lowering of the fuel level therein and connected to said valve stem by a snap-action device whereby to move the valve stem between fuel transfer and non-transfer positions in accord with changes of fuel level within said main tank.

ROBERT J. WOODS.